Patented Jan. 21, 1930

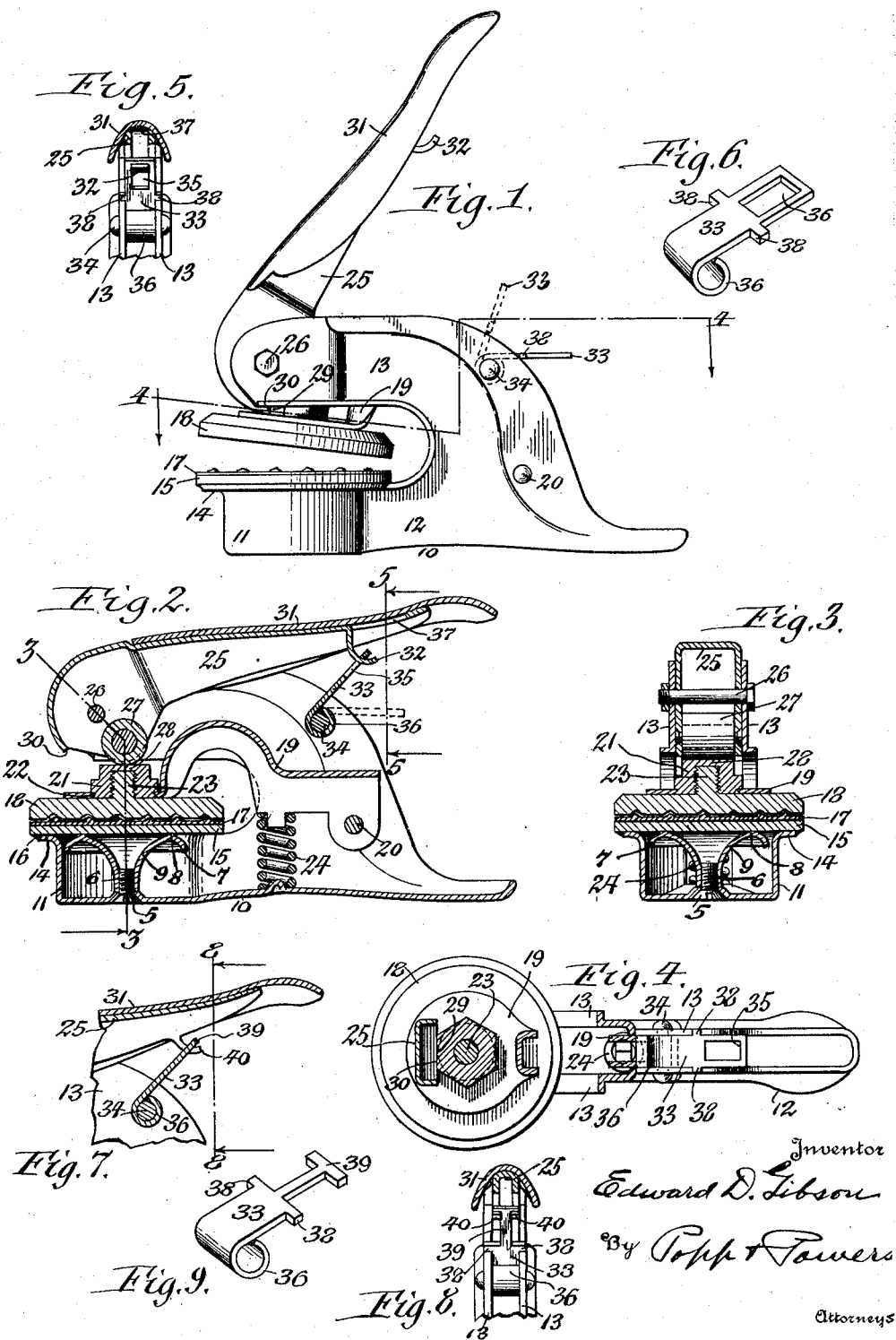

1,744,114

UNITED STATES PATENT OFFICE

EDWARD D. GIBSON, OF BUFFALO, NEW YORK, ASSIGNOR TO A. C. GIBSON COMPANY, OF BUFFALO, NEW YORK, A CORPORATION OF NEW YORK

SEALING PRESS

Application filed April 20, 1928. Serial No. 271,564.

This invention relates to a seal press for impressing legal documents and other papers such as are commonly used by notaries, courts and corporation officers, and has for its object the production of a seal press of this character which has improved means for supporting the die counter on the frame, an improved lock for holding the hand lever in its closed or depressed position, and also means whereby the hand lever may be utilized as a wrench for holding the fastening screw nut of the die against turning when it is desired to mount or dismount the die.

In the accompanying drawings:—

Figure 1 is a side elevation of a sealing press embodying my improvements.

Figure 2 is a vertical longitudinal section of the same.

Figure 3 is a vertical transverse section of the same taken on line 3—3 Fig. 2.

Figure 4 is a horizontal section taken on line 4—4 Fig. 1.

Figure 5 is a fragmentary vertical transverse section taken on line 5—5 Fig. 2.

Figure 6 is a perspective view of the handle lock shown in Figs. 1–5.

Figure 7 is a fragmentary vertical longitudinal section of the upper rear part of the sealing press, showing a modified form of the lock for handle contaning my invention.

Figure 8 is a vertical transverse section taken on the correspondingly numbered line in Fig. 7.

Figure 9 is a perspective view of the handle lock shown in Figs. 7 and 8.

In the following description the same reference characters indicate the corresponding parts of the invention shown in the several views of the drawings.

The frame of the machine is preferably constructed from sheet metal so as to form a hollow base 10 which opens upwardly and has a comparatively wide cylindrical front part 11 and a narrow channel shaped rear part 12 and an arm projecting from the rear part of the base upwardly and forwardly over the front part thereof and composed of two side pieces or sections 13 which are preferably formed integrally with the side walls of the channel shaped rear part of the base.

On its upper edge the enlarged front part of the base is provided with an outwardly projecting flange 14 upon which a die counter plate 15 is supported and permanently secured thereto by welding or brazing 16, which welding or brazing may be effected either electrically or by gas, or in any other suitable manner.

By thus welding the counter die plate upon the base of the frame these members are permanently connected in the manner which can be done rapidly and economically and also produces a simplified structure which is very strong and durable and not liable to get out of order.

In the absence of any provision to prevent it, the center of the die counter plate when subjected to very heavy pressure is liable to be deflected downwardly and thereby cause the counter die thereon to be deformed. To prevent this a central brace is provided for supporting the die counter plate on the adjacent part of the bottom of the frame. In its preferred form this brace has the form of an upwardly flaring hollow post 9, the upper enlarged end of which is secured to the underside of the die counter plate by electric welding, as shown at 8, or other suitable means and also provided with an external downwardly projecting annular flange 7 for stiffening and strengthening the upper end of the post.

The lower end of the post may be connected with the bottom of the frame by electric welding or by a screw engaging its threaded shank 6 with a threaded opening in the lower end of the post while its head 5 engages with an upwardly dished or countersunk seat 4 in the underside of the frame bottom, as shown in Figs. 2 and 3. A support of this character positively prevents the die counter and die counter plate from becoming distorted under heavy pressure.

On its upper side this counter die plate is provided with the usual counter die 17 which is adapted to cooperate with the die proper 18 for producing an embossed impression upon the sheet of paper or other material which is adapted to be impressed by the seal of the press.

This die is movable vertically toward and from the die counter and the same is also capable of being removed from its actuating means so that the die can be readily mounted and dismounted when required.

The means shown in the drawings for movably supporting the die comprise a die lever 19 arranged lengthwise between the two sections of the frame arm and supporting the die at its front end, while its rear end is pivoted to the rear part of the frame by means of a horizontal transverse pin 20 so that this die lever and the die are capable of vertical turning.

The means for detachably connecting the die with the die arm comprise a screw nut 21 which is mounted in an opening 22 in the front end of the die lever so as to be incapable of moving vertically on this lever, and the upper side of the die is provided with an upwardly projecting screw shank or stem 23 which engages with the internal thread of the screw nut 21 so that when the latter is turned in the proper direction for tightening the same, the die 18 will be drawn against the underside of the front part of the die lever, as shown in Figs. 1, 2 and 3.

The die and die lever when free are raised and yieldingly held in this position by means of a spring 24 arranged between the bottom of the frame and the central part of the die lever, as shown in Fig. 2. Various means may be employed for depressing the die and its support, those shown in the drawings being preferred and consisting of a vertically turning hand lever 25 which is arranged between the frame arm sections and is pivoted thereto at its front end by means of a transverse horizontal pin or bolt 26, and provided on the underside of its front part with a cam roller 27 engaging with the closed top 28 of the fastening screw 21.

Upon releasing the hand lever 25 the resilience of the spring 24 raises the die, die lever and hand lever into the position shown by full lines in Fig. 1, thereby separating the die and die counter and permitting a sheet of paper or other object to be inserted in the gap between these embossing members.

Upon depressing the hand lever, the cam action of the roller 27 on the fastening nut 21 causes the die and die lever to be depressed for producing an impression upon the sheet which may be placed between the opposing surface of these impression members.

When it is desired to remove the die from the die lever or to remount the same thereon the die is either unscrewed from the nut 21 or screwed thereon from the underside of the die lever. During such rotary motion of the die, it is necessary to prevent the nut 21 from turning in order to maintain the die in the desired position, particularly when it is necessary for the impression surface on the die to register with the impression surface of the die counter.

Rotation of the nut at this time is prevented by providing the same on its periphery with a plurality of flat surfaces 29 so that the same has the general form of a flat sided nut, for example a hexagonal nut, as shown in Fig. 4; and one or other of these surfaces is engaged by a gripping jaw 30 which is formed on the lower front part of the hand lever and is adapted to engage a flat front side of the nut, as shown in Fig. 4 when the hand lever is moved into its uppermost position, as shown in Fig. 1.

By this means the hand lever operates as a wrench for positively holding the screw nut 21 against turning when screwing the shank of the die into the nut or unscrewing the same therefrom when mounting or dismounting the die. No special tools are therefore required for this purpose when removal and remounting of the die is required, inasmuch as the press itself furnishes the necessary means for retaining the nut against rotation, thereby insuring against displacement of the die relative to the die counter and enabling the press to be maintained in the proper condition for producing a perfect impression.

In order to prevent the fingers of the hand which are employed for depressing the hand lever from becoming pinched and injured between the hand lever and the arms of the frame, a guard 31 is employed which is mounted on the rear part of the hand lever and overhangs the adjacent parts of the frame arms.

When the press is not in use the hand lever is locked in its depressed or closed position so as to render the same more compact for storage or transportation.

The locking device for this purpose which is shown in the drawings, is so constructed that it will hold the hand lever in a position in which the press is nearly closed and permits of automatically unlocking or releasing the hand lever by merely pressing the hand lever downwardly into the fully closed position of the press preparatory to using the same.

In the construction shown in Figs. 1–6 this locking device comprises a hook 32 projecting downwardly and rearwardly from the rear part of the hand lever 25, and a vertically swinging catch, latch or link 33 which is arranged between the arm sections of the frame and pivoted thereto by means of a horizontal transverse pin 34 while its upper end is provided with an opening 35 which is adapted to receive the hook 32 of the hand lever for holding the handle in a position in which it has nearly completed its downward stroke and the press is in its nearly closed position. In this operative position of the locking device the catch inclines upwardly and rearwardly from its axis so that upon depressing the handle when thus locked, and effecting the final part of its downward movement, the underside of the handle will engage with the upper end of the catch and forcibly move the same rearwardly and downwardly so that its opening is disengaged from the hook, thereby releasing the hand lever and permitting the same to move upwardly to its full extent under the action of the spring 24 without any interference from the catch, whereby the press is fully opened and ready for use in the ordinary way.

This action of positively forcing the catch out of engagement from the hook upon effecting the final portion of the downward motion of the handle, occurs when the pivot of the catch is fitted comparatively tight and the same is apt to remain in whatever position it occupies due to the friction in this pivot. If, however, the pivotal connection between the catch and the frame arms is comparatively loose the final part of the downward movement of the handle will permit the catch to swing automatically backwardly and downwardly out of engagement with the hook 32 and thereby release the handle so that the same is free to be moved upwardly thereafter by the action of the spring 24.

In the preferred construction, shown in Figs. 1–6, the pivotal connection between the catch and the pin 34 is produced by curling the lower end of the catch around this pivot pin, as shown at 36, and the hook 32 in the preferred construction is also preferably formed by stamping the same bodily out of the same stock which forms the rear part of the handle and thereby leaving an opening 37 in the handle where the stock is removed, as shown in Figs. 2 and 5. Obviously, however, this hook 32 may be made separate from the handle and connected thereto by soldering, riveting, screwing or any other well-known expedient.

When the catch is released from the hook 32 of the handle, the same is prevented from falling down too far and possibly getting in between the sections of the frame arm where the same would be difficult of access when it is desired to re-engage the catch with this hook for holding the press in its folded condition. Although various means may be employed for limiting the downward motion of the catch, it has been found satisfactory to employ for this purpose two stop lugs or projections 38 on opposite sides of the central part of the catch 33, as shown in Fig. 6, which lugs are adapted to engage with the rear edge portions of the frame arms, as shown in Figs. 1, 4 and 5, when the catch is out of engagement from the hook 32 and assumes a substantially horizontal position, as shown by full lines in Fig. 1 and by dotted lines in Fig. 2, in which position the free end of the catch projects beyond the frame and may be conveniently engaged by the finger of the hand for moving the same upwardly and into engagement with the hook for locking the hand lever in its depressed or nearly closed position.

These stop lugs 38 are also adapted to engage the outer facing edges of the frame arms in a position which will prevent the catch from being swung so far forward relative to the axis of the catch as would permit the same to remain in a forwardly projecting position and interfere with the depression of the hand lever while using the seal press. The upward and forward limit of the throw of this catch by reason of these stops 38 is indicated by dotted lines in Fig. 1, which shows that when this catch is thus moved into its uppermost position the same still leans backwardly relative to its axis and therefore will always be forced downward by the back of the catch 32 and into its rearwardly projecting inoperative position where it will not interfere with the depression of the hand lever. By limiting the forward movement of the catch in this manner, therefore, the catch cannot become jammed or interfere with the manipulation of the sealing press.

Instead of providing the upper or free end of the catch with a locking opening for the reception of a single hook on the underside of the hand lever, as shown in Figs. 1–6, substantially the same results can be obtained by constructing the upper or free end of the catch in the form of the letter T, as shown at 39 in Figs. 8 and 9, and engaging opposite ends of the cross-bar of this T-shaped stop with two downwardly and rearwardly projecting hooks 40 arranged on the opposite edges of the rear part of the handle, as shown in Figs. 7 and 8. The function and method of operation and the construction of the locking device for the handle, shown in Figs. 7, 8 and 9, is identical to that described with reference to the construction shown in Figs. 1–6.

The various improvements in this sealing press covered by the foregoing description and drawings, serve to materially simplify the construction of the press as a whole, also to facilitate the insertion and removal of the die and also permit of conveniently and expeditiously locking and unlocking the handle in its folded position without complicating the structure, but instead materially simplifying the same thereby effecting a substantial reduction in the cost of manufacture and rendering the apparatus as a whole more convenient for use.

In each of the several constructions of the locking device above described it is impossible to jamb or distort the hook 32 or 40 inasmuch as the same is arranged in rear of the pivot 34 and its underside is rounded so that it exerts, when depressed, a cam or wedge action on the catch and positively forces the latter downwardly by mechanical means into a released position.

Moreover by making this hook of flexible metal, as shown in the drawings, the same can be bent up or down so as to lock the handle in different positions to suit the thickness of the co-operating die and die counter.

I claim as my invention:—

1. A sealing press comprising a frame having a base and an arm projecting from the rear part of the base upwardly and forwardly over the front part thereof, a die counter mounted on the front part of said base, a die lever pivoted at its rear end on said frame and provided at its front end with an opening, a nut screw rotatable in said opening, a die engaging the underside of said die lever and adapted to cooperate with said die counter and provided with an upwardly projecting threaded shank which engages said screw nut, and a hand lever pivoted on said frame arm and having a cam for depressing said die and die arm and a gripping jaw for engaging said screw nut and holding the same against turning.

2. A sealing press comprising a frame having a base and an arm projecting upwardly and forwardly from the rear part of the base over the front part thereof, a die counter mounted on the front part of the base, a die lever pivoted on the frame, a die mounted on the die lever and adapted to cooperate with the die counter, a hand lever pivoted on the frame arm and having a cam for depressing said die and die lever, a locking catch pivoted at its lower end on the rear part of the frame, and a hook arranged on the hand lever and adapted to be engaged by the upper end of said catch, said catch inclining rearwardly when in its operative position and adapted to be engaged at its upper end by said hand lever upon depressing the latter and thereby disengaging said catch from said hook and releasing said hand lever.

3. A sealing press comprising a frame having a base and an arm projecting upwardly and forwardly from the rear part of the base over the front part thereof, a die counter mounted on the front part of the base, a die lever pivoted on the frame, a die mounted on the die lever and adapted to cooperate with the die counter, a hand lever pivoted on the frame arm and having a cam for depressing said die and die lever, a locking catch pivoted at its lower end on the rear part of the frame, and a hook arranged on the hand lever and adapted to be engaged by the upper end of said catch, said catch inclining rearwardly when in its operative position and adapted to be engaged at its upper end by said hand lever upon depressing the latter and thereby disengaging said catch from said hook and releasing said hand lever, and said catch being provided with a stop adapted to engage the adjacent part of the frame and arrest the downward movement of the same in a position below the reach of said hook.

4. A sealing press comprising a frame having a base and an arm projecting upwardly and forwardly from the rear part of the base over the front part thereof, a die counter mounted on the front part of the base, a die lever pivoted on the frame, a die mounted on the die lever and adapted to cooperate with the die counter, a hand lever pivoted on the frame arm and having a cam for depressing said die and die lever, a locking catch pivoted at its lower end on the rear part of the frame, and a hook arranged on the hand lever and adapted to be engaged by the upper end of said catch, said catch inclining rearwardly when in its operative position and adapted to be engaged at its upper end by said hand lever upon depressing the latter and thereby disengaging said catch from said hook and releasing said hand lever, said hook being stamped out of the metal forming the hand lever.

5. A sealing press comprising a frame having a base and an arm projecting upwardly and forwardly from the rear part of the base over the front part thereof, a die counter mounted on the front part of the base, a die lever pivoted on the frame, a die mounted on the die lever and adapted to cooperate with the die counter, a hand lever pivoted on the frame arm and having a cam for depressing said die and die lever, a locking catch pivoted at its lower end on the rear part of the frame and provided at its upper end with an opening and laterally projecting stop lugs adapted to engage the adjacent part of the frame in the released position of the catch, and a hook projecting rearwardly and downwardly from said hand lever and adapted to engage with the opening of said catch and hold the hand lever in its closed position.

6. A sealing press comprising a frame having a base consisting of a bottom and a wall rising from the edge of said bottom, a die counter plate engaging its marginal part with the upper edge of said wall, and a support engaging its upper end with the central part of said die counter plate and resting its lower end on said bottom.

7. A sealing press comprising a frame having a base consisting of a bottom and a wall rising from the edge of said bottom, a die counter plate engaging its marginal part with the upper edge of said wall, and a support interposed between the central part of said die counter plate and said bottom, and consisting of an upwardly flaring hollow post secured at its upper end to the underside of said plate and resting at its lower end on the upper side of said bottom.

8. A sealing press comprising a frame having a base consisting of a bottom and a wall rising from the edge of said bottom, a die counter plate engaging its marginal part with the upper edge of said wall, and a support interposed between the central part of said die counter plate and said bottom, and consisting of an upwardly flaring hollow post secured at its lower end to the frame bottom and resting on the latter and having its upper end secured to the underside of said counter die plate and provided with an external annular depending flange.

9. A sealing press comprising a frame having a base consisting of a bottom and a wall rising from the edge of said bottom, a die counter plate engaging its marginal part with the upper edge of said wall, a support interposed between the central part of said die counter plate and said bottom, and consisting of an upwardly flaring hollow post secured at its upper large end to the underside of said die counter plate and resting at its lower end on said bottom, and a screw connecting said post and bottom and having its threaded shank engaging a threaded opening in the lower small end of the post and its head engaging with a countersunk seat on the underside of said bottom.

In testimony whereof I hereby affix my signature.

EDWARD D. GIBSON.